W. H. JOHNSON.
Velocipede.
No. 97,411.                                    Patented Nov, 30, 1869.
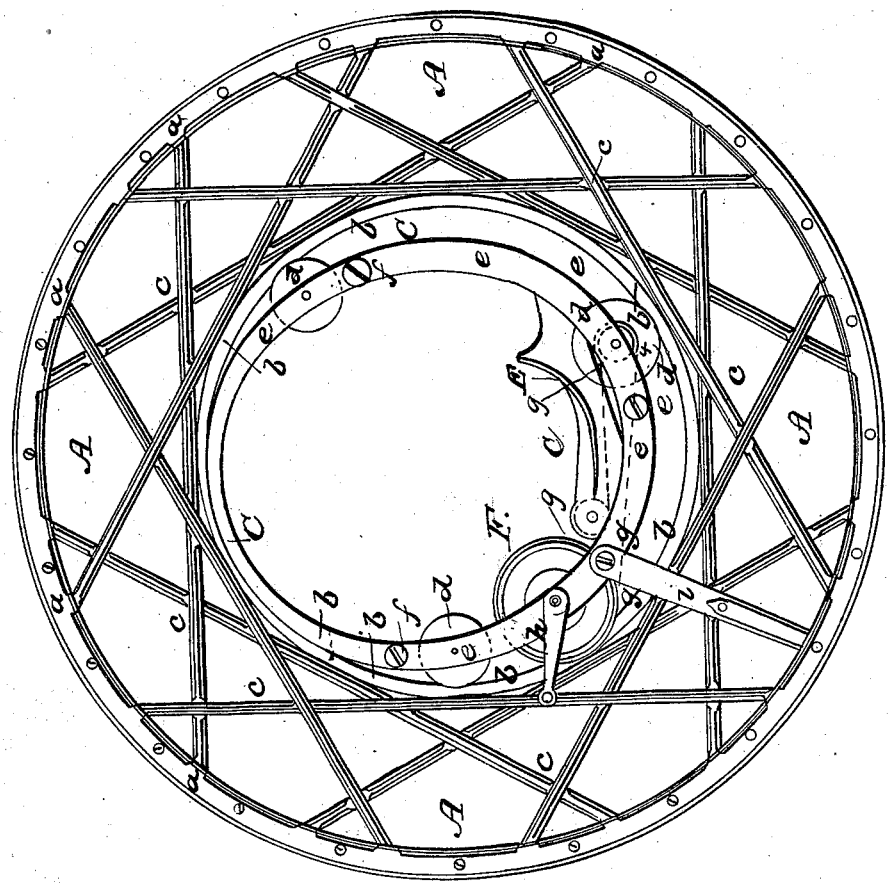

United States Patent Office.

WILLIS H. JOHNSON, OF SPRINGFIELD ILLINOIS.

Letters Patent No. 97,411, dated November 30, 1869; antedated November 27, 1869.

IMPROVEMENT IN VELOCIPEDES.

The Schedule referred to in these Letters Patent and making part of the same.

*To all whom it may concern:*

Be it known that I, WILLIS H. JOHNSON, of Springfield, in the county of Sangamon, and in the State of Illinois, have invented a new and improved Velocipede; and do hereby declare that the following is a full, clear, and exact description thereof, reference being had to the accompanying drawings, and to the letters of reference marked thereon.

The nature and principle of my invention are the construction of a velocipede with only one large wheel, which touches the ground, and communicating motion to this by making small wheels revolve within it; and as such small wheels, while communicating such motion to the large wheel, will retain their horizontal position in relation to the ground, I construct upon them a carriage for the transportation of individuals.

A is a wheel, of any desired size, say from five to eight feet in diameter, with an inside rim, $b$, describing a circle of about half the diameter of the whole wheel.

Between this inside rim $b$ and outer rim $a$, are the braces $c\ c\ c$, &c., for giving the large wheel A strength and endurance. These braces $c\ c\ c$ are of any desired number, and cross each other in every direction, and run from one point on the inside of the outer rim $a$, to such a point opposite on same rim, that the centre of each brace $c$ will touch, and be fastened to the rim of the inner circle $b$.

I construct the carriage C with the grooved wheels $d\ d\ d$, to revolve upon the inside of the rim $b$; the revolution of the wheels $d\ d\ d$, of this carriage C, compelling the revolution of the large wheel A, and the carriage C, which is fitted closely into the circle formed by the rim $b$, will always keep its centre of gravity during the revolution of the large wheel A.

This carriage C is constructed with the two circular side-pieces $e\ e$, connected together by means of the cross-beams $f\ f$. The three wheels $d\ d\ d$, grooved so as to keep their place on the inner rim $b$, which serves as a track for them to revolve upon, revolve upon their own axles, which are supported by these circular side-pieces $e\ e$.

One of these wheels is located between the circular side-pieces $e\ e$, directly under the rider's seat E, and the other on opposite sides of the carriage C, and about as high up as the head of the rider.

In front of the rider's seat E, is the driving-wheel F, connected with the axle of the grooved wheel $d$, underneath the rider's seat, by means of the leather belt $g$.

$h\ h$ are the two cranks, one on each side of the driving-wheel F, and $i\ i$ are the stirrups for the reception of the rider's feet.

These cranks $h\ h$, being turned by the rider, from his seat E, communicate motion to the wheel $d$, underneath the rider's seat, by means of the driving-wheel F and connecting-belt $g$, and this motion, thus communicated, throws the weight of the rider's body slightly forward beyond the centre of gravity, which starts the revolution of the large wheel A, and, by friction with the inner rim $b$ of the inner circle, the other small wheels $d\ d$, are made to revolve, and this revolution of the large wheel A brings the track of the wheels $d$, viz, the rim $b$, continually under these wheels, so that the whole carriage C may retain its horizontal position. Now,

What I claim as my invention, and desire to secure by Letters Patent, is—

1. The carriage C, constructed and arranged with the oval-shaped circular side-pieces $e\ e$, and cross-beams $f\ f$, grooved wheels $d\ d\ d$, driving-wheel F, connecting-belt $g$, cranks $h\ h$, stirrups $i\ i$, and seat E, substantially in the manner herein described, and for the purposes set forth.

2. The combination of the carriage C, constructed as described, with the braced wheel A, also constructed as described, substantially as and for the purposes set forth.

In testimony that I claim the foregoing, I have hereunto set my hand, this 31st day of March, 1869.

WILLIS H. JOHNSON.

Witnesses:
GEO. O. MARCY,
GEO. T. ALLEN.